United States Patent
Hsu

(10) Patent No.: US 9,133,953 B2
(45) Date of Patent: Sep. 15, 2015

(54) LINEAR TRAVEL STRUCTURE OF ELECTRICAL OPERATING DEVICE

(71) Applicant: Flowinn (Shanghai) Industrial Co., Ltd., Shanghai (CN)

(72) Inventor: Kuo-Feng Hsu, Shanghai (CN)

(73) Assignee: Flowinn (Shanghai) Industrial Co., Ltd., Shanghai (CN)

( * ) Notice: Subject to any disclaimer, the term of this patent is extended or adjusted under 35 U.S.C. 154(b) by 72 days.

(21) Appl. No.: 14/092,871

(22) Filed: Nov. 27, 2013

(65) Prior Publication Data

US 2015/0148185 A1 May 28, 2015

(51) Int. Cl.
*F16H 25/20* (2006.01)
*H02K 7/06* (2006.01)
*H02K 7/116* (2006.01)
*F16K 31/05* (2006.01)
*F16H 37/04* (2006.01)

(52) U.S. Cl.
CPC .............. *F16K 31/05* (2013.01); *F16H 37/04* (2013.01); *F16H 25/20* (2013.01); *F16H 2025/2087* (2013.01); *H02K 7/06* (2013.01); *H02K 7/116* (2013.01)

(58) Field of Classification Search
CPC ... F16H 25/20; F16H 2025/2087; H02K 7/06; H02K 7/116
See application file for complete search history.

(56) References Cited

U.S. PATENT DOCUMENTS

| 7,140,998 | B2 * | 11/2006 | Chou .......................... 475/331 |
| 2010/0090554 | A1 * | 4/2010 | Yano et al. ............... 310/156.01 |
| 2010/0282008 | A1 * | 11/2010 | Knudsen et al. ............. 74/89.23 |
| 2011/0232403 | A1 * | 9/2011 | Yu et al. ......................... 74/413 |
| 2012/0240696 | A1 * | 9/2012 | Bastholm et al. ............ 74/89.38 |
| 2014/0033842 | A1 * | 2/2014 | Morin et al. ................. 74/89.17 |
| 2014/0298980 | A1 * | 10/2014 | Cyren et al. ...................... 91/41 |

FOREIGN PATENT DOCUMENTS

WO    WO 2008087506 A2 *  7/2008

\* cited by examiner

*Primary Examiner* — Tisha Lewis
(74) *Attorney, Agent, or Firm* — Leong C. Lei

(57) ABSTRACT

A linear travel structure of an electrical operating device includes a body, a substrate, a cover, a first transmission assembly, a second transmission assembly, and a third transmission assembly. The body receives the substrate to mount thereto so as to enclose and define a first receiving space. The cover is mounted to the body and, together with the substrate, encloses and defines a second receiving space. The substrate includes an electrical machine mounted thereto and received in the second receiving space. The first transmission assembly, the second transmission assembly, and the third transmission assembly are all received in the first receiving space. The electrical machine is connected in cascade with the first, second, and third transmission assemblies for operation therewith. With such a multiple-staged transmission arrangement, advantages including high transmission efficiency, high bearing capacity, high speed ratio, and small volume, can be achieved over the conventional devices.

3 Claims, 4 Drawing Sheets

LINEAR TRAVEL STRUCTURE OF ELECTRICAL OPERATING DEVICE

(a) TECHNICAL FIELD OF THE INVENTION

The present invention generally relates to an electrical operating device that has multiple stages and utilizes planetary gears, and more particularly to a linear travel structure of an electrical operating device that features high transmission efficiency, high bearing capacity, high speed ratio, and small volume.

(b) DESCRIPTION OF THE PRIOR ART

A valve driver, which is also referred to as an actuator or an actuation mechanism, is a component commonly used in the field of automatic control for performing automatic operations, controlling or adjusting switches, and replacing manual operations and is classified as several types, according to the structure and operation thereof, such as linear travel, angular travel, and rotary type, of which the driving power can be pneumatic, hydraulic, electrical, or electrical/hydraulic. The valve driver can replace humans to directly carry out operations in risk areas and can greatly improve manufacturing performance due to control preciseness and operation efficiency.

Among the valve drivers, the kind that is operated with electrical power has unmatchable advantages over the other kinds. Among all of the kinds, the kind that is operated with electricity has been developed fastest and has the characteristics of easy acquirement of energy resources, fast response, high speed of signal transmission, remote transmission of signal, and being operable with digital devices.

The conventional valve drivers generally comprise a worm and worm gear arrangement to work with a clutch to realize transmission of power. Such an arrangement suffers the following disadvantages in the use thereof:

(1) The worm and worm gear arrangement requires a small lead angle for complete self-locking and this leads to an increased contact area and thus relatively poor efficiency.

(2) The worm and worm gear arrangement has a low efficiency of transmission and thus, severe wear may caused in the operation thereof (so that the clearance is gradually increased with the use thereof), whereby when the worm and the worm gear are set in engagement with each other for transmission, the relative slipping speed between the mated components is great, leading to increased wear and abrasion, reduced efficiency, and increased axial force of the worm.

SUMMARY OF THE INVENTION

The primary object of the present invention is that an electrical machine is combined with a first transmission assembly, a second transmission assembly, and a third transmission assembly to achieve multiple-staged transmission whereby, with such an arrangement, the problems of poor transmission efficiency and severe wear occurring in the prior art devices can be overcome to achieve the advantages of high transmission efficiency, high bearing capacity, high speed ratio, and small volume.

The present invention provides a linear travel structure of an electrical operating device, which comprises, structurally, a body. A substrate is mounted to one side of the body so that the substrate and the body enclose and define a first receiving space. A cover is mounted to one side of the body in such a way that the cover and the substrate enclose and define a second receiving space. The second receiving space receives therein an electrical machine. The first receiving space receives therein a first transmission assembly, a second transmission assembly, and a third transmission assembly. The electrical machine is mounted to a surface of the substrate and is operatively coupled to the first transmission assembly. The second transmission assembly is operatively coupled to the first transmission assembly. The third transmission assembly is operatively coupled to the second transmission assembly.

With such an arrangement, when put into operation, the electrical machine drives the first transmission assembly to rotate in synchronization therewith and, at the same time, the second transmission assembly and the third transmission assembly are also driven to rotate so as to achieve multiple-staged transmission. Due to the adoption of the NWG mechanism, the transmission efficiency can be greatly improved and at the same time, the problem of excessive wear can also be handled. Further, the interior space of the second receiving space can be fully used to greatly reduce the overall volume thereby achieving the advantages of high transmission efficiency, high bearing capacity, high speed ratio, and small volume.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
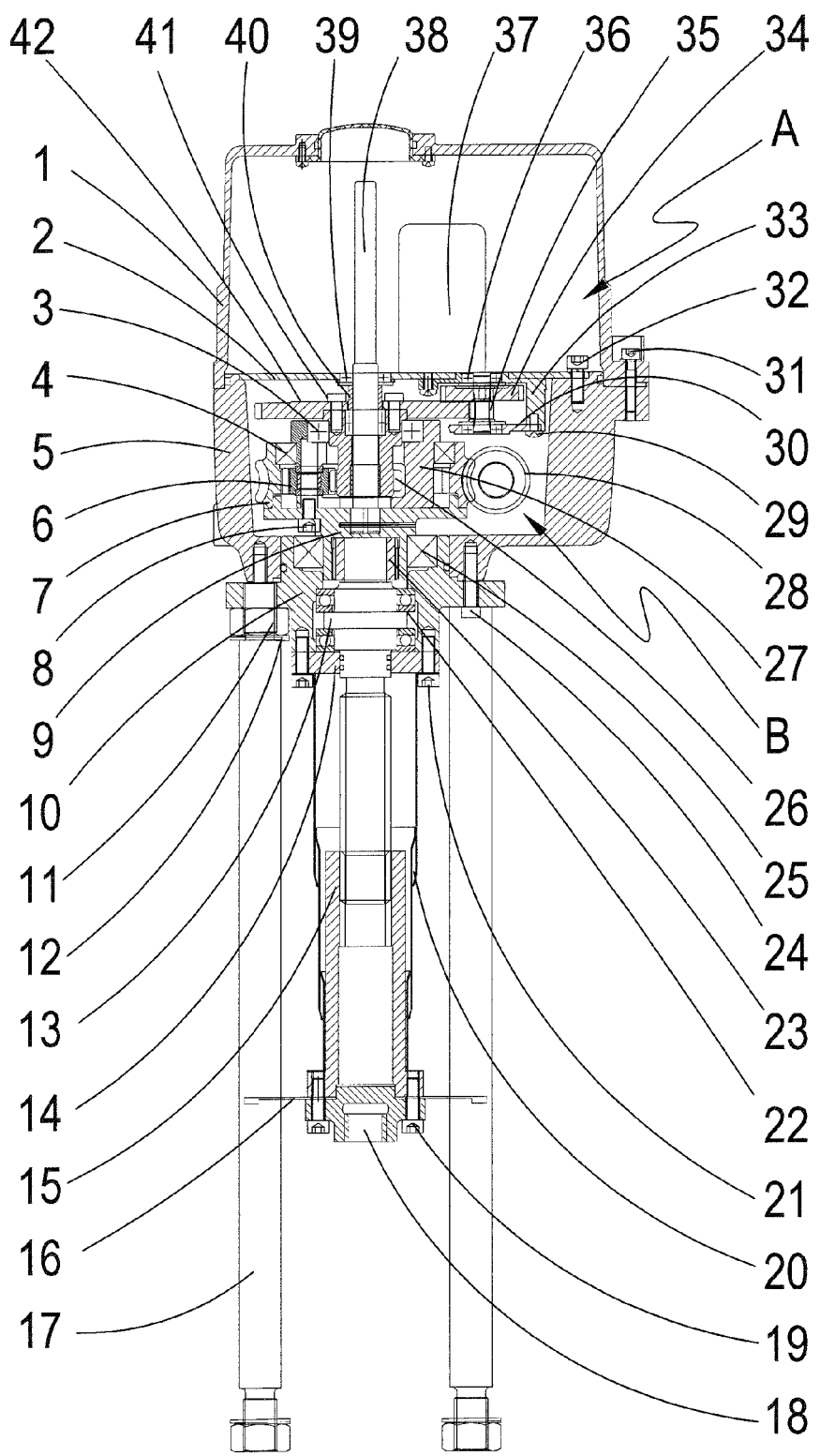
FIG. 1 is a longitudinal sectional view of a preferred embodiment of the present invention.
Figure 2:
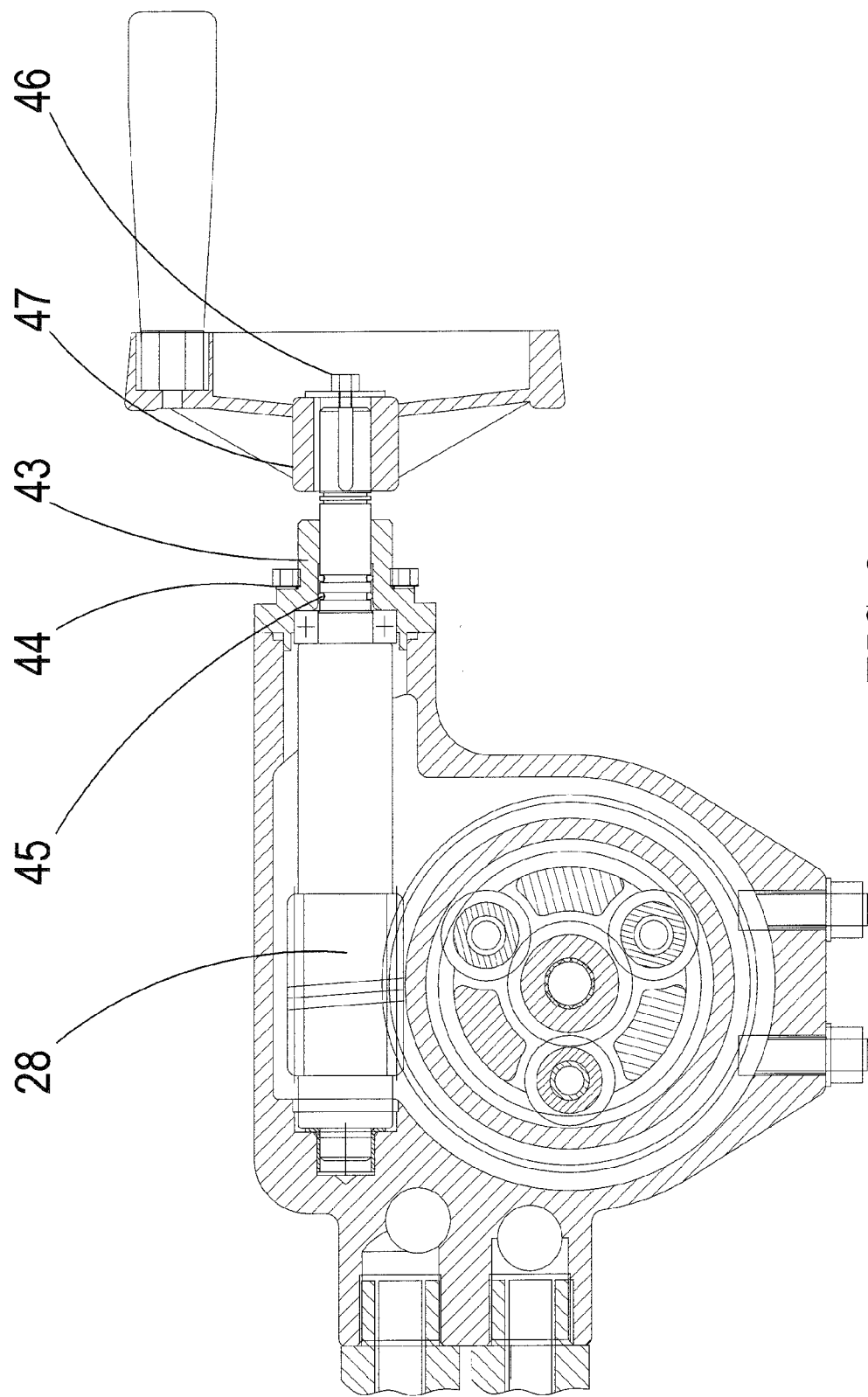
FIG. 2 is a lateral sectional view of the preferred embodiment of the present invention.
Figure 3:
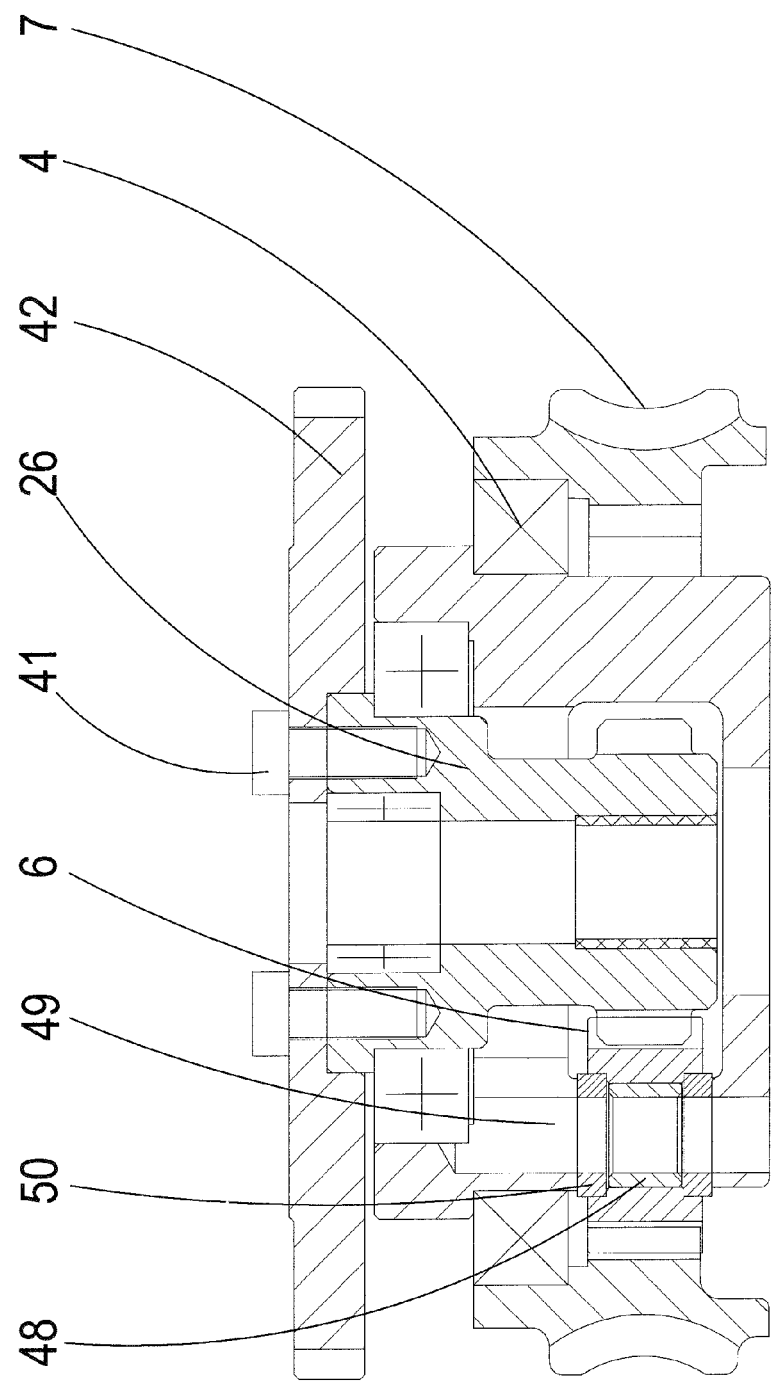
FIG. 3 is a longitudinal sectional view of a third transmission component of the preferred embodiment of the present invention.
Figure 4:
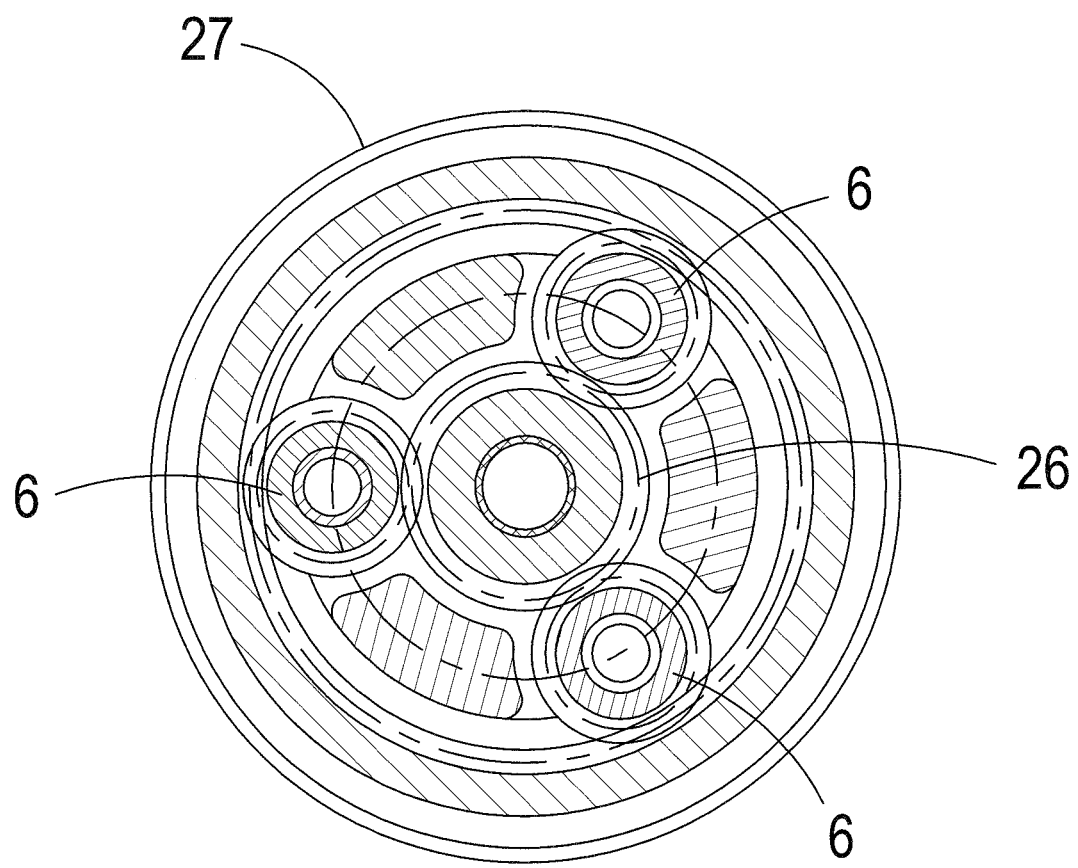
FIG. 4 is a lateral sectional view of the third transmission component of the preferred embodiment of the present invention.

As shown in FIGS. 1-4, which are respectively longitudinal sectional view and lateral sectional view of a preferred embodiment of the present invention and a longitudinal sectional view and a lateral sectional view of a third transmission assembly of the preferred embodiment of the present invention, it can be clearly seen from the drawings that the present invention comprises:

a body 5, wherein the body 5 comprises a substrate 2 arranged at one side thereof so that the substrate 2 and the body 5 enclose, delimit, and define a first receiving space A;

a cover 1, wherein the cover 1 is arranged at one side of the body 5 in such a way that the cover 1 and the substrate 2 enclose, delimit, and define a second receiving space B;

an electrical machine 37, which is mounted to a surface of the substrate 2 and is received in the second receiving space B;

a first transmission assembly, wherein the first transmission assembly is received in the first receiving space A and the first transmission assembly is operatively coupled to the electrical machine 37;

a second transmission assembly, wherein the second transmission assembly is received in the first receiving space A and the second transmission assembly is operatively coupled to the first transmission assembly; and a third transmission assembly, wherein the third transmission assembly is received in the first receiving space A and the third transmission assembly is operatively coupled to the second transmission assembly.

The above-mentioned electrical machine 37 has an output spindle that comprises a toothed section mounted thereto. The substrate 2 comprises a first gear 34 mounted thereto and arranged in the first receiving space A. The toothed section and the first gear 34 mate each other and the toothed section and the first gear 34 collectively constitute the above-mentioned first transmission assembly.

The above-mentioned first receiving space A further receives a gear shaft 35 and a second gear 42 that is coupled to the gear shaft 35 arranged therein. The gear shaft 35 and the second gear 42 collectively constitute the above-mentioned second transmission assembly.

The above-mentioned third transmission assembly is made up of a central gear 26, at least three planetary gears 6, a planet rack 27, a worm gear/internal gear 7, and an output shaft 9. The central gear 26 mates the planetary gears 6. The planetary gears 6 mate the worm gear/internal gear 7. The worm gear/internal gear 7 and the planet rack 27 are operable corresponding to each other. The planet rack 27 is coupled to the output shaft 9. The central gear 26 is coaxially fixed to the second gear 42 and details will be provided hereinafter.

The above-described arrangement provides the primary constituent components that achieve multiple-staged transmission of the present invention. In the following, the other components that are necessary for achieving the advantages of the present invention will be described. In the linear travel structure of an electrical operating device according to the present invention, a central shaft 38 is arranged at a center of the substrate 2 and the central shaft 38 has an end coupled to the output shaft 9. The output shaft 9 is fixed, via a coupling flange 10, to an opening formed in a bottom of the body 5. The planetary gears 6, the central gear 26, the planet rack 27, and the worm gear/internal gear 7 collectively form a NGW mechanism. The worm gear/internal gear 7 is coupled to a manual-operation worm 28. The manual-operation worm 28 has an end forming a projecting portion that is fixed, via a sleeve 43 and eighth bolts 44, to one side of the body 5, wherein the manual-operation worm 28 is coupled to the sleeve 43 in such a way as to be rotatable around a center of the sleeve 43 and the sleeve 43 is fixed to the body 5 by the eighth bolts 44, and comprises a plurality of O rings 45 fit over an outer circumference for preventing leaking of lubricant. The manual-operation worm 28 has an opposite end that is set in clearance fit in an internal hole formed in the body 5. The manual-operation worm 28 has a terminal portion to which a hand wheel 47 is fixed by a ninth bolt 46. The hand wheel 47 comprises a handle mounted thereto. The output shaft 9, the central gear 26, the planetary gears 6, the worm gear/internal gear 7, and the manual-operation worm 28 collectively constitute a manual operation portion of the electrical operating device.

The electrical operating device is made up of the first transmission assembly, the second transmission assembly, the third transmission assembly, and the above-described manual operation portion, wherein the NWG structure of the third transmission assembly forms a core mechanism of the entire electrical operating device.

The body 5 has a top end to which the substrate 2 is mounted. The substrate 2 comprises electrical components and the electrical machine 37 mounted thereto. The cover 1 is mounted to the top end of the body 5. The toothed section is formed on the output spindle of the electrical machine 37 and mates the first gear 34 for transmission of power. The first gear 34 is mounted via a flat key to the gear shaft 35. An end of the gear shaft 35 is mounted, via a third bearing 36, to a bearing seat 33 and an opposite end is mounted to a bearing cover 30. The bearing seat 33 is fixed by screws to the substrate 2. The above-mentioned toothed section of the output spindle of the electrical machine 37, the first gear 34, and the electrical machine 37 constitute the first transmission assembly that receives the transmission of power and the gear shaft 35 and the second gear 42 constitute the second transmission assembly.

The third transmission assembly is made up of the central gear 26, the planetary gears 6, the planet rack 27, the worm gear/internal gear 7, and the output shaft 9. The central gear 26 mates the planetary gears 6. The planetary gears 6 mate the worm gear/internal gear 7. When the electrical machine 37 is set in operation, the manual-operation worm 28 is not allowed to rotate, whereby the worm gear/internal gear 7 is prevented from rotation by the self-locking of the manual-operation worm 28; the planet rack 27 is caused to rotate by the engagement between the central gear 26 and the planetary gears 6. The planet rack 27 and the output shaft 9 are coupled to each other by first bolts 8 so that when the planet rack 27 rotates, power is transmitted through the first bolts 8 to the output shaft 9. The output shaft 9 is coupled, at a lower end thereof, to an internal hole formed in a lower portion of the body 5 by a second bearing 25.

The above-described NGW mechanism is the essential core of the entire electrical operating device. The second gear 42 is fixed by seventh bolts 41 to the central gear 26. The central gear 26 has an end having an outer circumference in clearance fit with the first bearing 3. The planetary gears 6 are each provided therein with a bearing collar 48, which is mounted to the planet rack 27 through interference fitting achieved at one end of a connection shaft 49. The planetary gear 6 and the planet rack 27 comprise a copper pad 50 arranged therebetween so that ends of the planetary gear 6 and the planet rack 27 are spaced from each other. The central gear 26 and the planetary gears 6 form external engagement, while the worm gear/internal gear 7 and the planetary gears 6 form internal engagement. Such an arrangement constitutes the NGW mechanism.

For manual operation, the electrical machine 37 is de-activated and does not rotate. The hand wheel 47 and the manual-operation worm 28 are coupled to each other through a flat key for driving the worm gear/internal gear 7 to rotate. Since the central gear 26 is kept fixed by the damping effect of the electrical machine 37, the planet rack 27 is caused to rotate by the engagement between the planetary gear 6 and the worm gear/internal gear 7 thereby transmitting rotational motion to the output shaft 9. The output shaft 9 is coupled by a spline collar 23 to a screw rod 13, so that the power is further transmitted through the screw rod 13 to a driving nut 15. The driving nut 15 is coupled by second bolts 19 to a nut 18. As such, reciprocal rotation of the screw rod 13 drives the driving nut 15 to move up and down for controlling opening/closing of the valve, wherein an indication plate 16 is provided to indicate the location of the valve in order to accurately obtain the opening/closing condition of the valve. A protection hood 20 is provided in an extendible/retractable arrangement to prevent debris from entering the threaded portion of the screw rod 13 during the operation of the electrical operating device. Support posts 17 are provided for mounting the electrical operating device.

In the above described structure, besides the combination of the components described above, the following components are also provided for the purposes of fixing and assisting of the operation, including a first bearing 3, a second bearing 4, a nut 11, a flat washer 12, a retention lid 14, third bolts 21, a first bearing 22, fourth bolts 24, fifth bolts 29, a bearing cover 30, loosening prevention bolts 31, sixth bolts 32, a fourth bearing 39, and a distance-setting sleeve 40, these components being retention means necessary for achieving the structure of the present invention, but are generally irrelevant to the technical features of the present invention, so that details associated with the relationships and positions will not be provided herein.

The technical features that the present invention adopts to improve the known techniques are as follows:

The electrical operating device adopts a multiple-staged transmission arrangement to thoroughly improve severe wearing and poor transmission efficiency of the prior art and also to effectively use the entire available space in order to achieve the advantages of high transmission efficiency, high bearing capacity, high speed ratio, and small volume.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A linear travel structure of an electrical operating device, comprising:
    a body, wherein the body comprises a substrate arranged at one side thereof so that the substrate and the body enclose, delimit, and define a first receiving space;
    a cover, wherein the cover is arranged at one side of the body in such a way that the cover and the substrate enclose, delimit, and define a second receiving space;
    an electrical machine, which is mounted to a surface of the substrate and is received in the second receiving space;
    a first transmission assembly, wherein the first transmission assembly is received in the first receiving space and the first transmission assembly is operatively coupled to the electrical machine;
    a second transmission assembly, wherein the second transmission assembly is received in the first receiving space and the second transmission assembly is operatively coupled to the first transmission assembly; and
    a third transmission assembly, wherein the third transmission assembly is received in the first receiving space and the third transmission assembly is operatively coupled to the second transmission assembly;
    wherein the third transmission assembly comprises a central gear, at least three planetary gears, a planet rack, a worm gear/internal gear, and an output shaft, the central gear mating the planetary gears, the planetary gears mating the worm gear/internal gear, the worm gear/internal gear and the planet rack being operable corresponding to each other, the planet rack being coupled to the output shaft.

2. The linear travel structure of the electrical operating device according to claim 1, wherein the electrical machine has an output spindle that comprises a toothed section mounted thereto, the substrate comprises a first gear mounted thereto and arranged in the first receiving space, the toothed section and the first gear mating each other, the toothed section and the first gear collectively constituting the first transmission assembly.

3. The linear travel structure of the electrical operating device according to claim 1, wherein the first receiving space receives a gear shaft and a second gear that is coupled to the gear shaft arranged therein, the gear shaft and the second gear collectively constituting the second transmission assembly.

* * * * *